(12) United States Patent
Pos (10) Patent No.: US 12,036,849 B2
(45) Date of Patent: Jul. 16, 2024

(54) SHADING APPARATUS FOR A VEHICLE INTERIOR OF A MOTOR VEHICLE

(71) Applicant: BOS GmbH & Co. KG, Ostfildern (DE)

(72) Inventor: Robert Pos, Esslingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 17/826,293

(22) Filed: May 27, 2022

(65) Prior Publication Data

US 2022/0396126 A1 Dec. 15, 2022

(30) Foreign Application Priority Data

Jun. 14, 2021 (DE) .......................... 102021206022.6

(51) Int. Cl.
*B60J 1/20* (2006.01)
*B60J 7/00* (2006.01)

(52) U.S. Cl.
CPC ........... *B60J 1/2052* (2013.01); *B60J 1/2044* (2013.01); *B60J 7/0015* (2013.01)

(58) Field of Classification Search
CPC ...... B60J 1/2011; B60J 1/2013; B60J 1/2044; B60J 1/2052; B60J 1/2063; B60J 7/00; B60J 7/02; B60J 7/0015; B60J 7/0007; B60J 7/043; B60J 7/067; B60J 7/085; B60J 3/02; B60P 7/02; B60P 7/04; E06B 9/08;

(Continued)

(56) References Cited

U.S. PATENT DOCUMENTS 6,179,373 B1 * 1/2001 Bohm .................... B60J 7/0015
296/214
9,108,491 B2 8/2015 Zendath
(Continued)

FOREIGN PATENT DOCUMENTS

CN 101842256 A 9/2010
CN 205706108 U 11/2016
(Continued)

OTHER PUBLICATIONS

German Office Action issued in corresponding German Application No. 10 2021 206 022.6 date of mailing Jan. 19, 2022 (5 pages).
(Continued)

*Primary Examiner* — Jason S Daniels
(74) *Attorney, Agent, or Firm* — FLYNN THIEL, P.C.

(57) ABSTRACT

Shading apparatus having a carrier frame on which a roller blind shaft, with a flexible roller blind web, is rotatably supported. A guiding profile arrangement laterally guides the roller blind web, and opposing lateral edges of the roller blind web are each provided with a lateral guiding strip guided in the region of each guiding profile arrangement such that, in partially extended operating position of the roller blind web, a tension is applied to the roller blind web transversely relative to the extension direction of the roller blind web. Adjacent to an end-face bearing of the roller blind shaft, there is provided at both sides a support guide for moving the respective lateral guiding strip into a channel portion of the guiding profile arrangement which positioned between the end-face bearing and an open end-face region of the channel portion of the guiding profile arrangement.

13 Claims, 8 Drawing Sheets

(58) Field of Classification Search
CPC ..... E06B 9/40; E06B 9/42; E06B 9/58; E06B 9/581
USPC .............. 296/143, 214, 216.01, 216.08, 987
See application file for complete search history.

(56) References Cited

U.S. PATENT DOCUMENTS

| | | |
|---|---|---|
| 9,889,726 B2 | 2/2018 | Umeki et al. |
| 10,974,579 B2 | 4/2021 | Mueller et al. |
| 11,318,822 B2 * | 5/2022 | Riegger ................. B60J 1/2052 |
| 2008/0277077 A1 * | 11/2008 | Rockelmann .......... B60J 7/0015 |
| | | 160/268.1 |
| 2011/0226426 A1 * | 9/2011 | Zendath ................. B60J 7/0015 |
| | | 160/370.22 |
| 2013/0341972 A1 * | 12/2013 | Choi ...................... B60J 7/0015 |
| | | 296/214 |
| 2017/0087966 A1 * | 3/2017 | Umeki ................... B60J 1/2041 |
| 2017/0113522 A1 | 4/2017 | Rockelmann et al. |
| 2021/0046810 A1 | 2/2021 | Mueller et al. |

FOREIGN PATENT DOCUMENTS

| | | |
|---|---|---|
| CN | 112368163 A | 2/2021 |
| DE | 102017111358 A1 | 11/2018 |
| DE | 102017217429 A1 | 4/2019 |
| DE | 102018108354 A1 | 10/2019 |

OTHER PUBLICATIONS

Chinese Office Action issued in corresponding Chinese Application No. 202210667272.1 dated Apr. 27, 2024 (7 pages).

\* cited by examiner

SHADING APPARATUS FOR A VEHICLE INTERIOR OF A MOTOR VEHICLE

CROSS REFERENCE TO RELATED APPLICATION

This claims priority from German Application No. 10 2021 206 022.6, filed Jun. 14, 2021, the disclosure of which is hereby incorporated by reference in its entirety.

TECHNICAL FIELD

The invention relates to a shading apparatus for a vehicle interior of a motor vehicle, having a carrier frame. A roller blind shaft, on which a flexible roller blind web is retained so as to be able to be wound up and unwound, is rotatably supported on the carrier frame. The carrier frame is provided at opposite longitudinal sides with guiding profile arrangements for laterally guiding the roller blind web. Opposite lateral edges of the roller blind web are each provided with a lateral guiding strip guided in the region of one of the guiding profile arrangements in such a manner that, in an at least partially extended operating position of the roller blind web, a tension is applied to the roller blind web transversely relative to an extension direction of the roller blind web.

BACKGROUND AND SUMMARY

Such a shading apparatus is known for a glass roof region of a passenger vehicle from DE 10 2017 217 429 A1. The known shading apparatus has a carrier frame which is mounted, from a lower side, on roof body portions of the passenger vehicle. In the carrier frame, a roller blind web can be displaced between a shading position which shades the glass roof region and an idle position which unblocks the glass roof region. The roller blind web is retained so as to be able to be wound up and unwound on a roller blind shaft which is rotatably supported in the carrier frame. The roller blind web has at the front end region thereof, which is at the front in the extension direction, a dimensionally stable extension profile displaceably guided in lateral guiding rails of the carrier frame. At the opposite lateral edges of the roller blind web which extend in the longitudinal direction, the roller blind web is provided with lateral guiding strips which are in each case guided in the respective lateral guiding rail. It is thereby, on the one hand, ensured that, in the shaded position of the roller blind web, the lateral edges of the roller blind web and the lateral guiding rails of the carrier frame overlap relative to each other so that no visible gap remains between the roller blind web and the lateral guiding rails. On the other hand, the lateral guiding strips maintain a transverse tension of the roller blind web so that sagging of the roller blind web in the shaded position of the roller blind web is prevented.

An aspect of the invention is to provide a shading apparatus of the type mentioned in the introduction which during operation enables a consistently good impression of quality.

This is achieved in that, adjacent to an end-face bearing of the roller blind shaft, there is provided at both sides a support guide for moving the respective lateral guiding strip into a channel portion of the guiding profile arrangement. The support guide is positioned between the end-face bearing and an open end-face region of the channel portion of the respective guiding profile arrangement. In one embodiment, "adjacent" to the bearing means that the support guide is arranged, in a pulling direction of the roller blind web, so as to be offset with respect to a rotary bearing location for the roller blind shaft. This solution enables a reliable movement of the lateral guiding strip in the region of each side edge of the roller blind web from the wound up idle position into the respective guiding profile arrangement, so that, starting from the idle position of the roller blind web as far as the extended shading position, a consistent transverse tension can be applied on the roller blind web. The support guide additionally enables secure introduction of the respective lateral guiding strip into the guiding profile arrangement of the carrier frame which is secured to the vehicle. This solution is provided in a particularly advantageous manner for shading a glass roof region of a vehicle interior of a passenger vehicle. In the same manner, the shading apparatus according to the invention can also be used for other windows of motor vehicles.

In an embodiment, the support guide has a profile portion which is provided for the linearly movable guiding and the transverse support of the lateral guiding strip. A precise guiding and centering of the lateral guiding strip in the direction of the channel portion of the guiding profile arrangement is thereby achieved.

In another embodiment, the support guide is associated with a resiliently flexible guiding flap which supports a roller blind web strip, which roller blind web strip adjoins the lateral guiding strip transversely relative to the extension direction, at the lower side with pretensioning during an unwinding or winding-up operation. The roller blind web strip which adjoins the lateral guiding strip is a part-region of the flexible roller blind web which part-region forms a folded-over edge region surrounding the respective lateral guiding strip, or has a longitudinal seam or merges in the transverse direction in an unchanged state into the remaining region of the roller blind web and consequently does not differ from this remaining region of the roller blind web. The roller blind web is preferably made from a textile material, in particular from a knitted textile material. The resiliently flexible guiding flap supports the roller blind web during an unwinding operation or a winding-up operation in a transition region between the roller blind web winding and an inlet end side of the guiding profile arrangement from below in order to support an introduction of the side edge of the roller blind web in a manner inclined in the longitudinal direction. A corresponding lateral roller blind web strip at end edges of the support guide is thereby prevented from becoming damaged at end edges of the support guide during a winding-up or unwinding operation. This ensures a good impression of quality, even in the event of relatively long operation of the shading apparatus. The guiding flap forms a bridge which extends substantially parallel with the path of the lateral guiding strip and supports the strip-like longitudinal portion, which strip-like longitudinal portion of the roller blind web laterally adjoins the lateral guiding strip in the transverse direction, from a lower side.

In another embodiment, the guiding flap extends from the support guide in the extension direction of the roller blind web in the direction of the roller blind shaft. The guiding flap protrudes freely from the support guide and preferably has a tongue-like curvature in the longitudinal direction which brings about a support of the roller blind web strip which is curved in an arcuate manner in the direction of the roller blind shaft.

In another embodiment, as the end-face bearing of the roller blind shaft, a bearing module is provided at opposing end faces of the roller blind shaft and the support guide is secured to the bearing module. The support guide is arranged, in the pulling-out direction of the roller blind web, to be offset with respect to a rotary bearing portion of the bearing module for the roller blind shaft. By securing the support guide to the bearing module, a uniform handling of the bearing module, the roller blind shaft, the roller blind web and the support guide, which enables a pre-assembly of this unit, is ensured.

In another embodiment, the support guide is in the form of a plastics material component. Preferably, in one embodiment the support guide is produced as an injection-molded component.

In another embodiment, the support guide and the bearing module have mutually complementary plug-type connection portions, by means of which the support guide can be secured to the bearing module without tools. A simple plug-type assembly of the support guide on the bearing module is thereby ensured.

In another embodiment, the resiliently flexible guiding flap is formed integrally on the support guide. A production of the support guide together with the guiding flap is thereby ensured in a single-step production operation as a plastics material component. Preferably, in one embodiment the guiding flap is produced from the same material as the support guide. Alternatively, it is possible to produce the guiding flap from a resiliently more flexible plastics material than the support guide. In this instance, a production can be carried out by means of coextrusion of different plastics materials.

In another embodiment, the guiding flap is positioned in a laterally offset manner with respect to the profile portion of the support guide, which profile portion is provided to guide the lateral guiding strip. The guiding flap consequently extends—when viewed in the longitudinal direction of the lateral guiding strip—in a laterally offset manner with respect to the profile portion of the support guide for the lateral guiding strip. In this instance, however, the guiding flap may protrude further in a longitudinal direction from the support guide in the direction of the roller blind shaft than the profile portion of the support guide.

BRIEF DESCRIPTION OF THE DRAWINGS

Other advantages and features of the invention will be appreciated from the following description of a preferred embodiment of the invention which is illustrated with reference to the drawings, in which.

DETAILED DESCRIPTION

Figure 1:
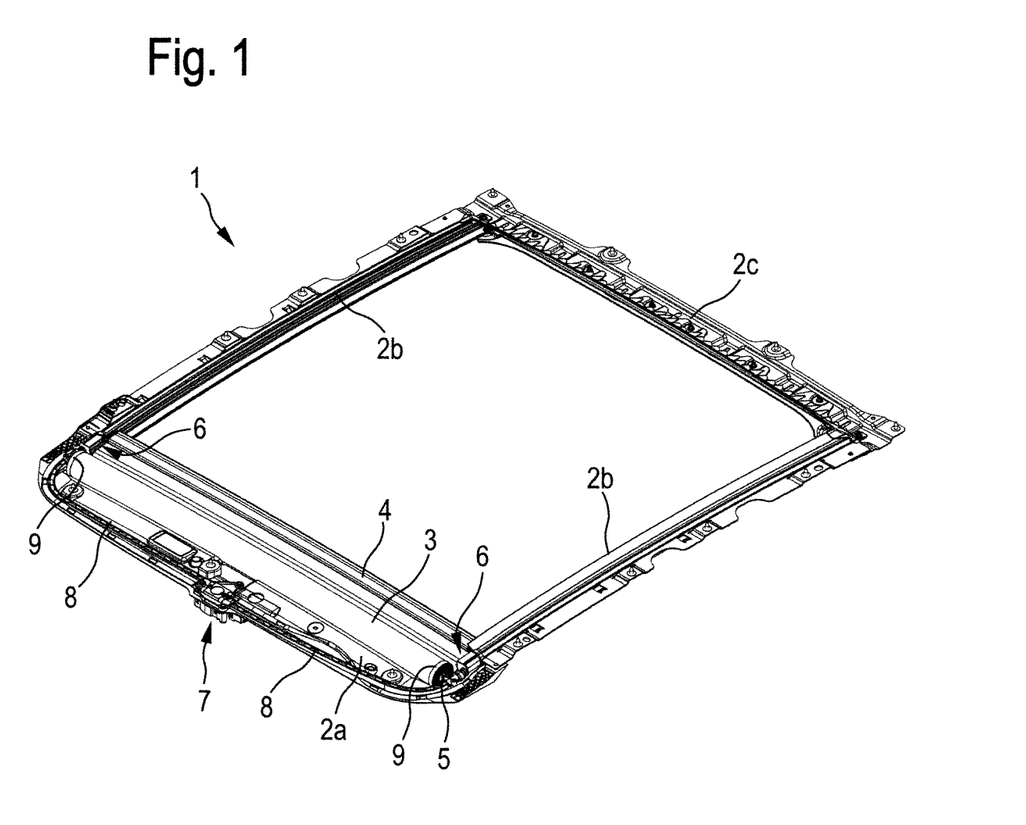
FIG. 1 shows a perspective illustration of an embodiment of a shading apparatus according to the invention.
Figure 2:
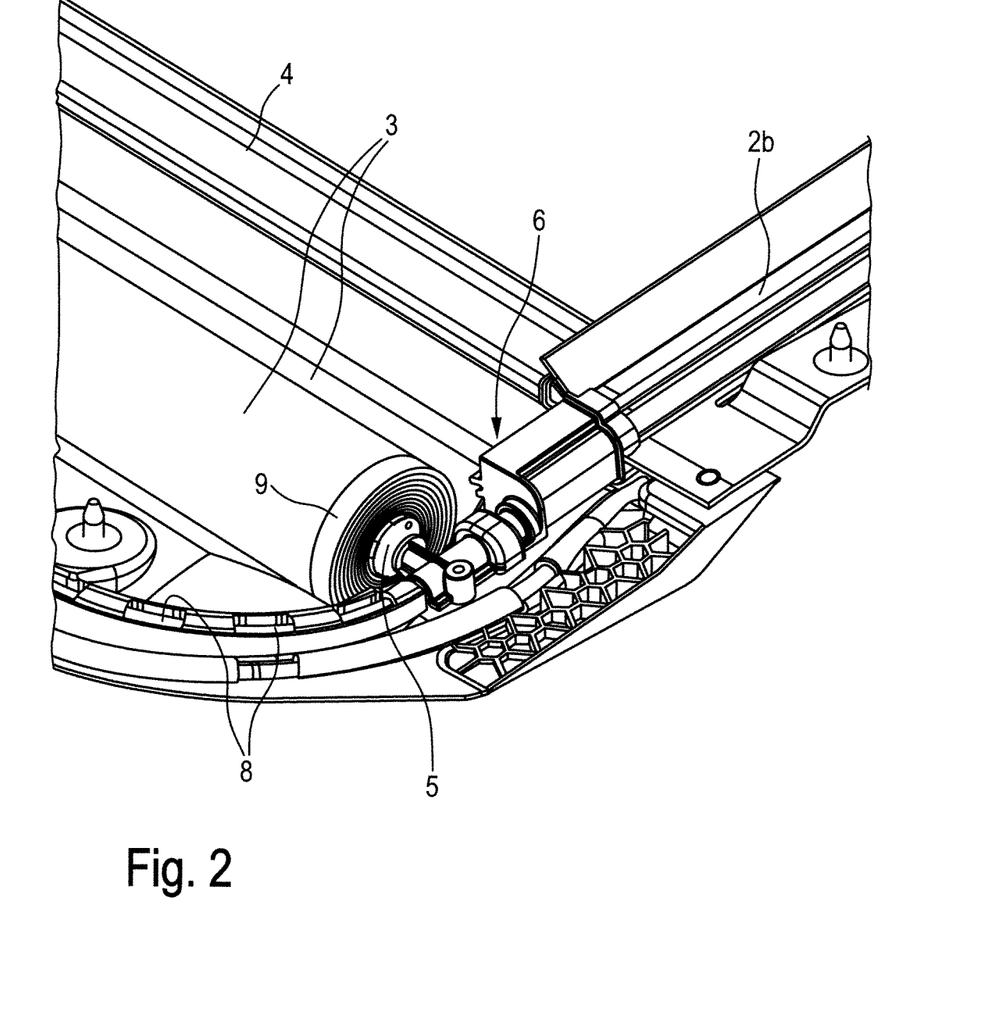
FIG. 2 shows an enlarged perspective illustration of a part-region of the shading apparatus according to FIG. 1.
Figure 3:
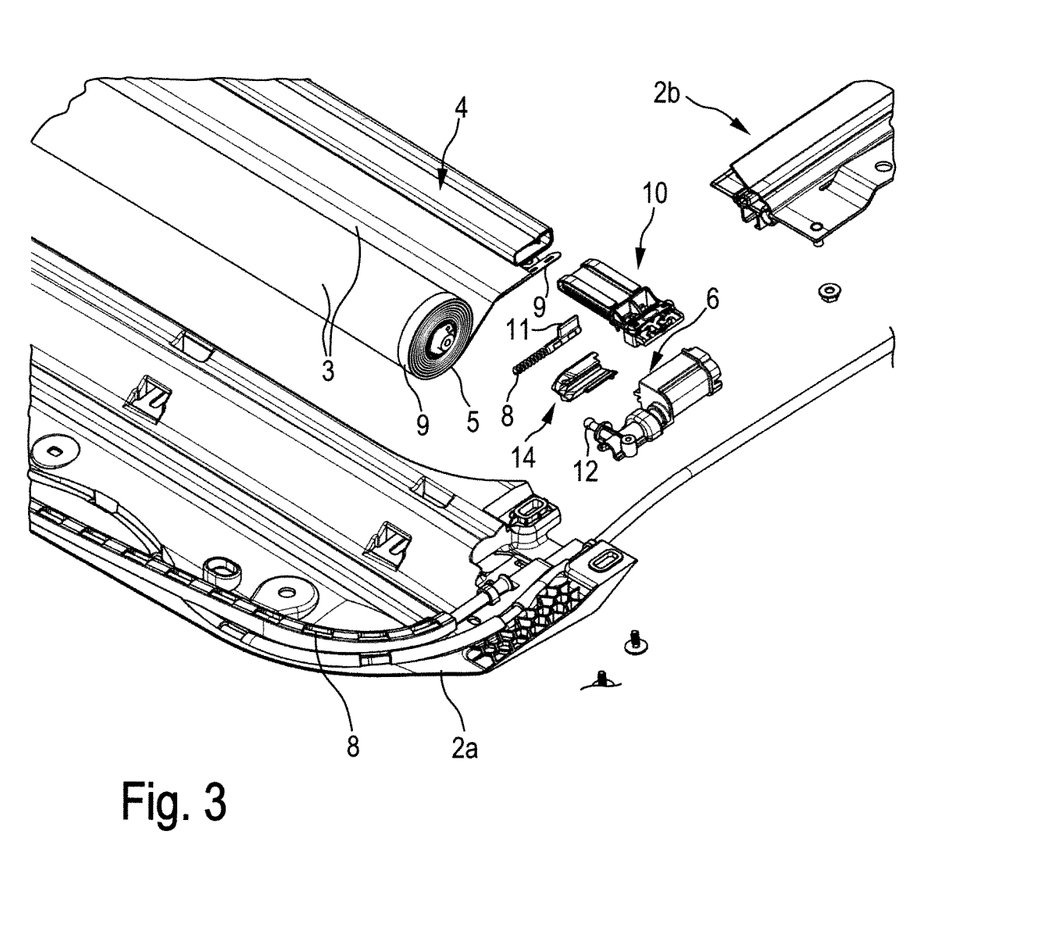
FIG. 3 shows a perspective exploded view of the part-region of the shading apparatus according to FIG. 2.

A shading apparatus 1 according to FIGS. 1 to 3 is provided to shade a glass roof region of a passenger vehicle. In a state mounted on the vehicle, the shading apparatus 1 is mounted in the vehicle interior below the glass roof region. The shading apparatus 1 has a carrier frame 2a to 2c which carries functional components of the shading apparatus 1 as described below. In the mounted state of the shading apparatus 1, the carrier frame is securely connected to roof body structural components of a roof region of the passenger vehicle. The carrier frame 2a to 2c has a front portion 2a, two side portions each having a guiding profile arrangement 2b and a rear portion 2c. In the state assembled on the vehicle, the front portion 2a and the rear portion 2c extend in the transverse vehicle direction. The two opposing guiding profile arrangements 2b extend, in the state of the carrier frame 2a to 2c secured to the vehicle, in the longitudinal vehicle direction. The opposing guiding profile arrangements 2b are orientated parallel with each other. The front portion 2a, the two side portions with the guiding profile arrangements 2b and the rear portion 2c are connected to each other in a dimensionally stable manner to form a square frame.

The front portion 2a of the carrier frame carries a roller blind shaft 5 which, in the mounted operating state of the shading apparatus 1, extends in the transverse vehicle direction and which is rotatably supported in a "vessel-like" recess of the front portion 2a by means of two bearing modules 6. On the roller blind shaft 5, a roller blind web 3, which is in the form of a planar structure, is retained so as to be able to be wound up and unwound. The roller blind web 3 is securely connected at the front end region thereof (at the front in the unwinding direction) to a dimensionally stable extension profile 4 which extends over an entire width of the roller blind web 3 in the transverse vehicle direction. The extension profile 4 is provided in each case at the opposing front ends thereof with a termination or connection element 10. Each termination element 10 is inserted into an open end face of the extension profile 4 and is securely connected to the extension profile 4. Each termination element 10 is supported in a corresponding guiding channel of the guiding profile arrangement 2b of the carrier frame so as to be able be slidingly moved along the guiding channel and consequently along the guiding profile arrangement 2b.

In order to displace the connection elements 10 which act as a carrier for the extension profile 4 and the roller blind web 3, there is provided a drive system which has an electric drive motor 7 and two drive transmission trains 8 which are configured as thread pitch cables. The drive motor 7 is positioned centrally in the region of a lower side of the front portion 2a of the carrier frame 2a to 2c and coupled to a gear mechanism which is not described in greater detail and which drives the two drive transmission trains 8 synchronously. The thread pitch cables which act as drive transmission trains 8 are displaced, starting from the drive motor 7 to the opposing guide profile arrangements 2b, in the front portion 2a and extend through the respective guiding profile arrangement 2b. In order to guide the thread pitch cable, receiving channels which are not described in greater detail are provided in the front portion 2a. Corresponding guiding grooves in the guiding profile arrangements 2b for guiding the drive transmission trains 8 are formed parallel with the guiding channels for the terminal elements 10 of the extension profile 4. Each of the two drive transmission trains 8 is coupled to the respective terminal element 10 in a positive-locking manner by means of a coupling element 11. Each drive transmission train 8 has approximately double the length of the length of the respective lateral guiding profile arrangement 2b for guiding the respective terminal element 10. In order to enable a linear guiding of these significant lengths of the drive transmission trains 8, the receiving channels in the front portion 2a also extend in each case toward the other side. These portions act as empty guides for the portions of the drive transmission trains which are not in traction or push mode. The configuration of the receiving channels of the front portion 2a and the function and displacement of the drive transmission trains 8 are known from the prior art.

The roller blind web 3 can be moved between an at least substantially wound-up operating position, which can be seen with reference to FIGS. 1 to 3, and a shading position which is extended along the guiding profile arrangements 2b toward the rear, that is to say, toward the rear portion 2c. In this instance, the extension profile 4 is displaced parallel between the two guiding profile arrangements 2b from the front to the rear by means of a synchronous drive of the two drive transmission trains 8. As a result of the displacement of the extension profile 4, the roller blind web 3 is necessarily unwound from the roller blind shaft 5 and extends over an entire length and width of the opening delimited by the carrier frame. The length and width of this opening corresponds at least substantially to the surface of the glass roof region which is intended to be shaded.

The roller blind web 3 is provided at the opposing elongate side edges thereof with a lateral guiding strip 9 which extends along each longitudinal side of the roller blind web 3 over an entire length of the roller blind web 3 and is securely connected to the respective side edge of the roller blind web 3. Each lateral guiding strip 9 is stitched to the respective lateral edge of the roller blind web 3 along a central line of the lateral guiding strip 9 so that a connection which is T-shaped in cross section is formed between the lateral guiding strip 9 and the lateral edge of the roller blind web 3. The lateral guiding strip 9 has a higher level of rigidity than the roller blind web 3 and serves, when the roller blind web 3 is unwound from the wound-up idle position, to maintain a transverse tension in the transverse vehicle direction over an entire length of the wound-up portion of the roller blind web 3 in order to prevent a sagging of the roller blind web 3 in the unwound shaded position. The two lateral guiding strips 9 are to this end guided in a linearly movable manner in the opposing guiding profile arrangements 2b. The two guiding profile arrangements 2b each have a guiding groove which is not described in greater detail. The grooves guide the lateral guiding strips 9 in a laterally supported manner in a transverse vehicle direction so as to be able to be slidingly moved and linearly moved in a longitudinal vehicle direction.

Figure 4:
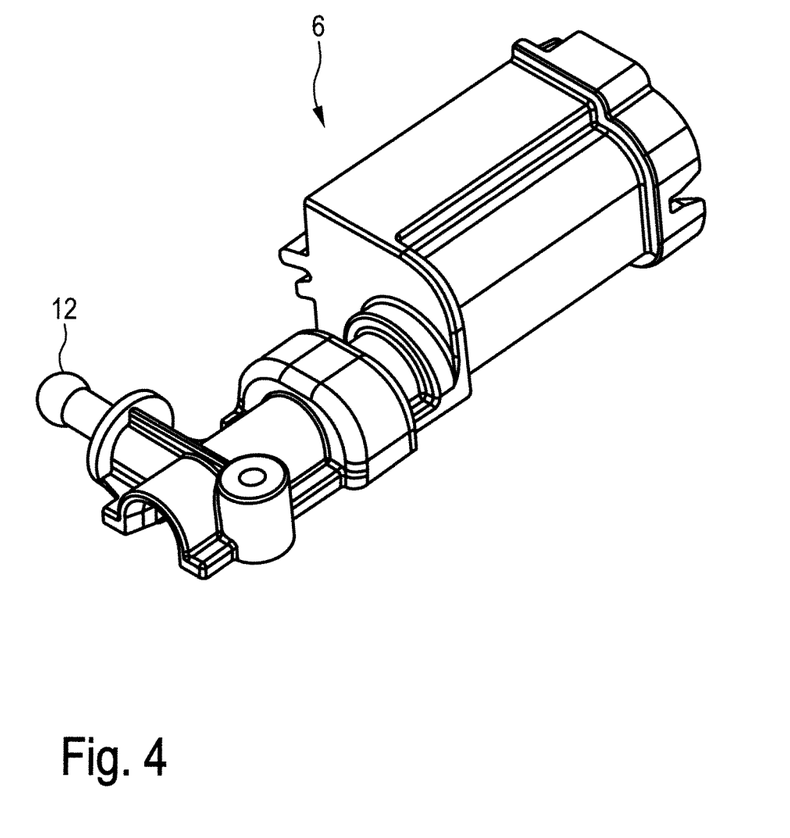
FIG. 4 shows an enlarged perspective illustration of a bearing module of the shading apparatus according to FIGS. 1 to 3.
Figure 5:
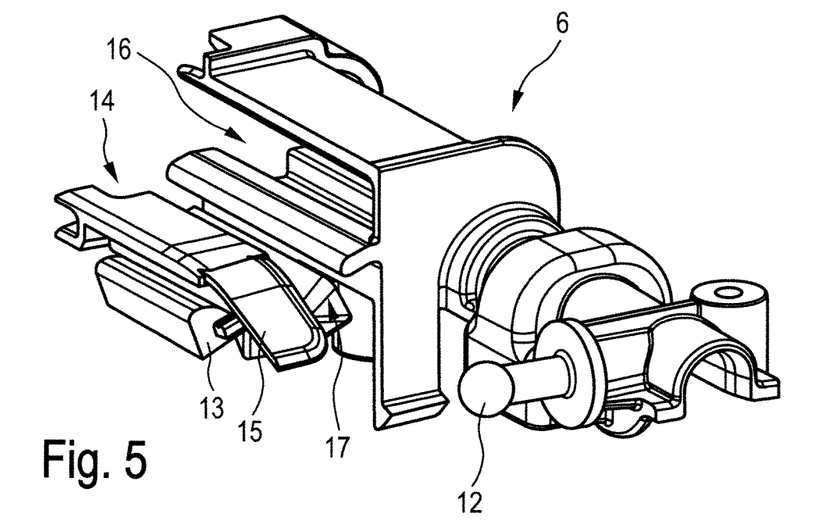
FIG. 5 shows another perspective illustration of the bearing module according to FIG. 4, in which a support guide which is secured to the bearing module can be seen.
Figure 6:
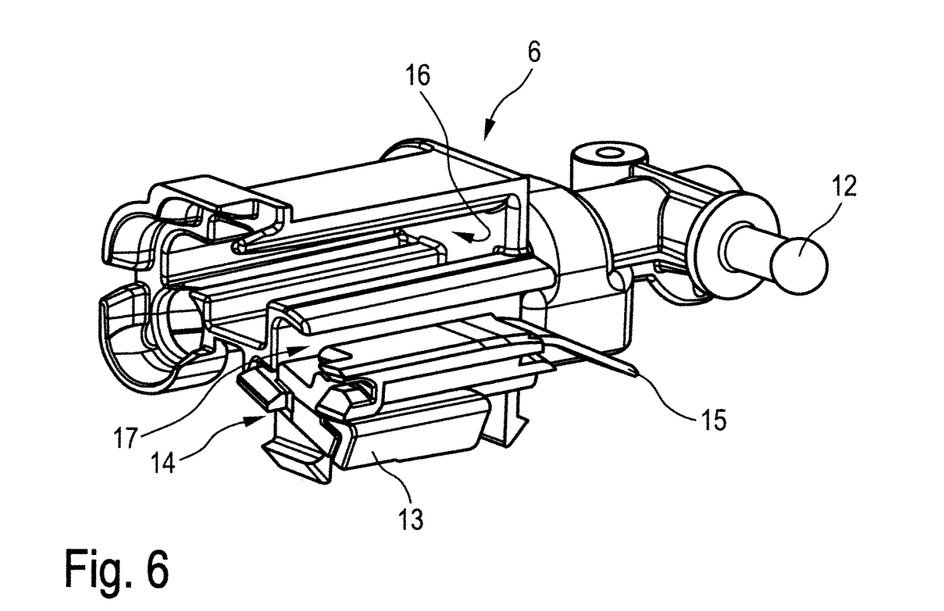
FIG. 6 shows another perspective illustration of the bearing module with a support guide according to FIG. 5.
Figure 7:
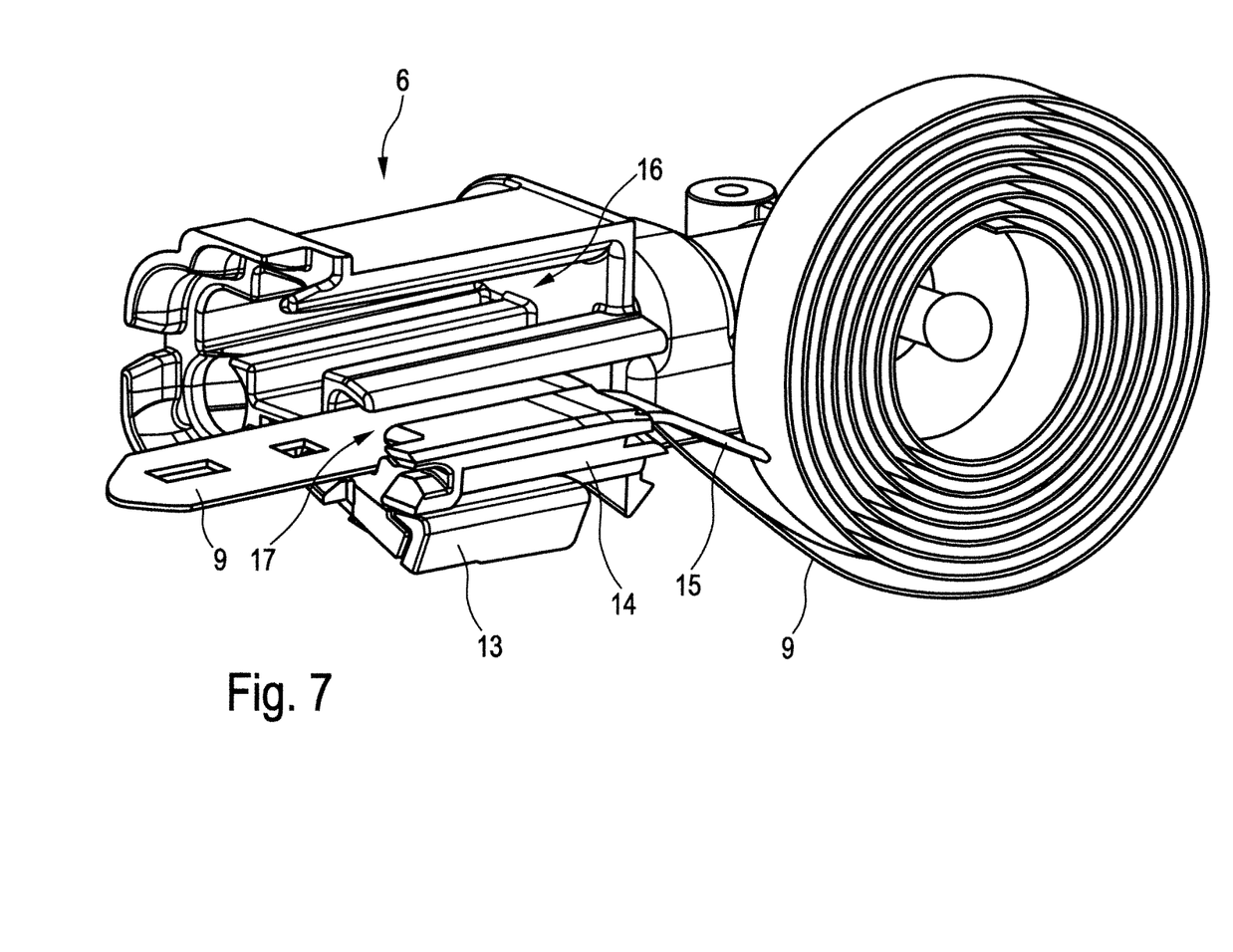
FIG. 7 shows a perspective illustration of the bearing module with a support guide according to FIGS. 5 and 6 and with an additional illustration of a lateral guiding strip of a roller blind web of the shading apparatus according to FIGS. 1 to 3.
Figure 8:
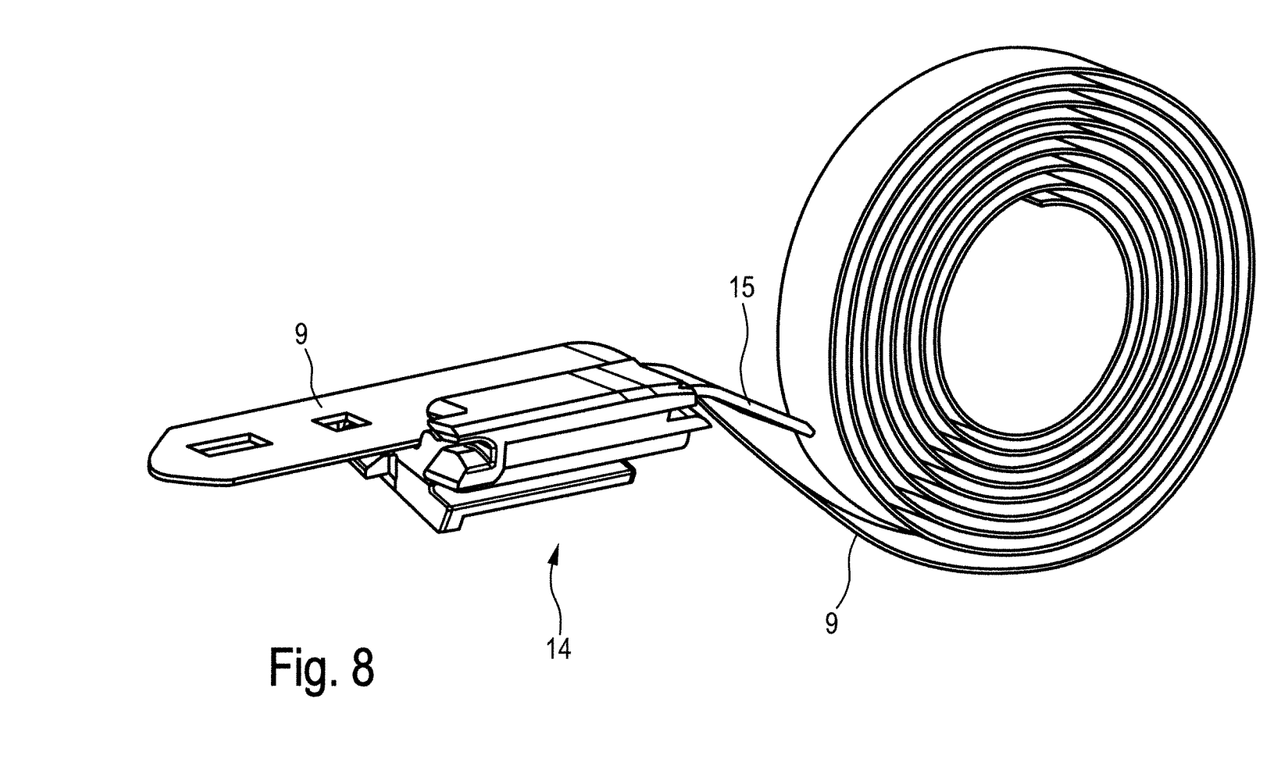
FIG. 8 shows the illustration according to FIG. 7, but with the bearing module being omitted.

The two bearing modules 6 each have a bearing journal 12 for the rotationally movable bearing of the roller blind shaft 5. In addition, each bearing module 6 serves to transmit the respective drive transmission train 8 from the corresponding receiving channel of the front portion 2a into the corresponding guiding channel of the respective guiding profile arrangement 2b. Finally, each bearing module 6 has a parking receiving member 16 for securing the respective terminal element 10 in an idle position of the extension profile 4. Each bearing module 6 is additionally provided with plug-type guides which are directed toward the respective guiding profile arrangement 2b in order to enable a flush connection of the bearing module 6 to a facing end face of the guiding profile arrangement 2b.

Figure 9:
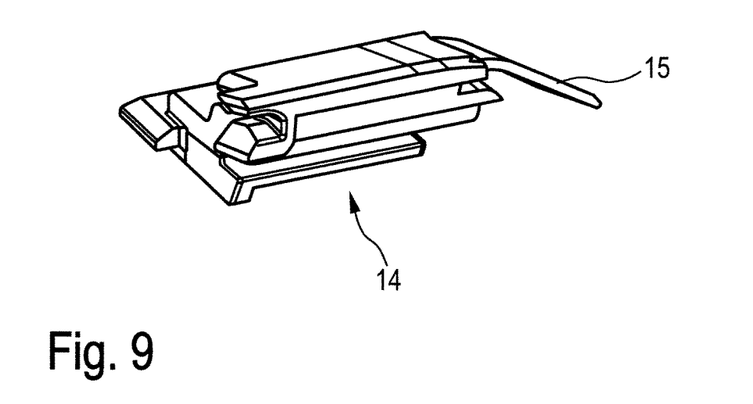
FIG. 9 shows an enlarged perspective illustration of the support guide for the bearing module according to FIGS. 5 to 8.

As can additionally be seen with reference to FIGS. 5 to 9, a support guide 14 is associated with the bearing module 6 and according to FIG. 9 represents a separately produced plastics material component. The support guide 14 can be received by means of a plug-type portion in a complementary plug-type profiling 13 of the bearing module 6 and can thus be connected to the bearing module 6 without tools but nonetheless in a secure manner. As can be clearly seen in FIGS. 5 to 7, the support guide 14 has a guiding profile portion 17 for guiding the lateral guiding strip 9 of the roller blind web 3 in a linearly movable manner. The guiding profile portion 17 (also referred to only as a profile portion 17) forms, transversely relative to the extension direction of the roller blind web 3 and consequently in the state of the shading apparatus 1 mounted so as to be secured to the vehicle, a positive-locking support wall in order to prevent a movement of the lateral guiding strip 9 toward the vehicle center. A lateral edge of the roller blind web 3 is connected in the region of the lateral guiding strip 9 in such a manner that a roller blind strip which is adjacent to the lateral guiding strip 9 and which cannot be seen extends from a central longitudinal region of the lateral guiding strip 9 beyond a surface of the support guide 14 toward the center when the roller blind web 3 is in an at least partially extended operating position. The lateral edge is connected to the lateral guiding strip 9 along a center line of the lateral guiding strip 9 with a pivoting movability between the lateral guiding strip 9 and the lateral edge of the roller blind web 3 formed in the region of this center line. In cross section, consequently, a T-shaped connection of a lateral end edge of the lateral edge of the roller blind web 3 is produced on the lateral guiding strip.

The support guide 14 is illustrated with reference to FIG. 3. FIG. 3 shows that this roller blind web strip would slide away when the extension profile 4 is displaced over a relatively sharp-edged front end face of the support guide 14. In order in this case to prevent damage to the roller blind web 3 at the transition to the respective lateral guiding strip 9, when the roller blind web 3 enters the bearing module 6 and subsequently the guiding profile arrangement 2b, the support guide 14 has in addition a guiding flap 15 which protrudes in the direction of the bearing journal 12 of the bearing module 6 and consequently in the direction of the roller blind shaft 5 and which flap 15 is configured in a resiliently flexible manner. The guiding flap 15, as can be seen with reference to FIGS. 5 to 8 and 9, is inclined in a curved manner in a forward and downward direction with respect to a surface of the support guide 14. With reference to FIGS. 5 to 9, an unloaded idle position of the guiding flap 15 can be seen. As soon as the roller blind web (which is not illustrated with reference to FIGS. 7 and 8) is positioned on the guiding flap 15, the guiding flap 15 is necessarily pretensioned in a downward direction, wherein the guiding flap 15 consequently supports from below the roller blind web strip of the roller blind web 3, which strip is located directly adjacent to the lateral guiding strip 9. The guiding flap 15 is formed integrally on the support guide 14 and protrudes at the front side from an upper profile portion of the support guide 14 freely in a forward direction. The guiding flap 15 is laterally offset in the transverse direction with respect to the profile portion 17 for the lateral guiding strip 9, as can be seen clearly in FIGS. 5 to 9. The support guide 14 terminates, when the bearing module 6 is in a state mounted ready for operation, flush with a correspondingly adjacent end face of the guiding profile arrangement 2b. The support flap 15 consequently forms a gentle redirection of the roller blind web when the roller blind web slides along the support guide 14 of the bearing module 6 and in the direction of the guiding profile arrangement 2b. Damage to the roller blind web at the transition thereof to the lateral guiding strip 9 during operation of the shading apparatus 1 is thereby reliably prevented.

The invention claimed is:

1. A shading apparatus for use in an interior of a motor vehicle, said shading apparatus comprising:
a carrier frame, said carrier frame including a pair of guiding profile arrangements, said guiding profile arrangements being laterally spaced from one another in a direction transverse to a longitudinal front-to-back direction of the motor vehicle, each said guiding profile arrangement including a longitudinally extending channel having an open entry end;
a roller blind shaft having opposite ends rotatably supported on said carrier frame;
a flexible roller blind web retained on said roller blind shaft such that said roller blind web is unwindable from said roller blind shaft in an extension direction into an extended position and windable onto said roller blind shaft into a retracted position, said roller blind web having a pair of longitudinally extending edge portions spaced apart from one another in the direction transverse to the longitudinal front-to-back direction of the motor vehicle, said roller blind web including a pair of longitudinally extending lateral guiding strips each fixed to one of said edge portions, said lateral guiding strips being configured to tension said roller blind web in a direction transverse to the extension direction of the roller blind web when in the extended position; and
a pair of support guides, said support guides being laterally spaced from one another in the direction transverse to the longitudinal front-to-back direction of the motor vehicle, each said support guide being mounted on said carrier frame adjacent one of said ends of said roller blind shaft, each said support guide being configured for guiding one of said lateral guiding strips of said roller blind web into said open entry end of said channel of one of said guiding profile arrangements, each said support guide being disposed longitudinally between said one end of said roller blind shaft and said open entry end of said one guiding profile arrangement, and each said support guide including a resiliently flexible guiding flap disposed to support from below part of said edge portion of said roller blind web during movement of said roller blind web into the extended or the retracted position, said part being joined to the respective lateral guiding strip.

2. The shading apparatus according to claim 1, wherein each said guiding flap extends in the extension direction of said roller blind web.

3. The shading apparatus according to claim 1, wherein each said guiding flap extends in the extension direction of said roller blind web and towards said roller blind shaft.

4. The shading apparatus according to claim 1, wherein each said guiding flap comprises an elongate tongue, said tongue extending along the longitudinal front-to-back direction of the motor vehicle, each said tongue having a first end fixed to the respective support guide and a second free end spaced from said first end.

5. The shading apparatus according to claim 4, wherein each said tongue projects smoothly in a downward direction with said first end being disposed at a greater vertical height than said second end.

6. The shading apparatus according to claim 1, wherein each said part of said edge portion of said roller blind web is disposed immediately adjacent and inwardly of the respective lateral guiding strip in a direction transverse to the extension direction of said roller blind web.

7. The shading apparatus according to claim 1, wherein each said support guide includes a longitudinally extending support channel configured to receive therein said one lateral guiding strip, each said support channel being configured to guide said one lateral guiding strip in a linear manner into said channel of said one guiding profile arrangement and to support said one lateral guiding strip in the direction transverse to the extension direction of said roller blind web.

8. The shading apparatus according to claim 7, wherein each said guiding flap is disposed laterally offset from the respective said support channel in a direction transverse to the extension direction of said roller blind web.

9. The shading apparatus according to claim 1, wherein said parts of said roller blind web are disposed inwardly of the respective lateral guiding strips, each said support guide defines therein a longitudinally extending support channel configured to receive said one lateral guiding strip, said guiding flap of the respective support guide being offset laterally inwardly from said support channel in a direction transverse to the extension direction of said roller blind web, each said guiding flap being disposed in supportive engagement with a lower side of said part of said roller blind web when said lateral guiding strip is disposed in said support channel.

10. The shading apparatus according to claim 1, wherein each said guiding flap is formed integrally with the respective support guide.

11. The shading apparatus according to claim 1, further comprising a pair of bearing modules mounted on said carrier frame, said bearing modules being laterally spaced from one another in the direction transverse to the longitudinal front-to-back direction of the motor vehicle, each said bearing module being configured to support one of said ends of said roller blind shaft, each said support guide being secured to one of said bearing modules.

12. The shading apparatus according to claim 11, wherein said bearing module and the respective support guide each include complementary connecting elements configured to permit connection of said support guide to said bearing module without tools.

13. The shading apparatus according to claim 1, wherein each said support guide is constructed of plastic.

* * * * *